June 1, 1965 J. E. DRUMMOND ETAL 3,187,310

SOLID STATE DATA STORAGE AND SWITCHING DEVICES

Filed Oct. 17, 1963

2 Sheets-Sheet 1

INVENTORS
JAMES E. DRUMMOND
ROY R. JOHNSON
BETSY ANCKER-JOHNSON

BY Reynolds & Christensen

ATTORNEYS

INVENTORS
JAMES E. DRUMMOND
ROY R. JOHNSON
BETSY ANCKER-JOHNSON
BY
Reynolds & Christensen
ATTORNEYS 3,187,310

SOLID STATE DATA STORAGE AND SWITCHING DEVICES

James E. Drummond, Bellevue, Roy R. Johnson, Vashon, and Betsy Ancker-Johnson, Seattle, Wash., assignors to The Boeing Company, Seattle, Wash., a corporation of Delaware Filed Oct. 17, 1963, Ser. No. 316,941
19 Claims. (Cl. 340—173)

This invention relates to data storage and switching devices and more particularly concerns a new class of bistable elements and electric circuit systems incorporating the same. The invention is herein illustratively described by reference to the presently preferred embodiments thereof; however, it will be recognized that certain modifications and changes therein, together with certain extensions of the uses thereof beyond those disclosed herein may be employed without departing from the essential features involved.

The art of switching circuits, computers, coincidence circuits, memory or storage circuits, etc., has developed extensively utilizing such basic bistable memory elements as magnetic core transformers, ferroelectric elements, and various bistable circuit combinations, such as the diode-capacitor type. In each instance, output transient response to read-out stimulus is dependent upon preconditioning (i.e. upon digit storage) and upon the polarity of the read-out voltage or current impulse applied. Such output response is a direct voltage or current impulse and must be transmitted and processed as a direct quantity. An object of this invention in one aspect is to provide a bistable memory element and apparatus utilizing the same, which may function with the general-application versatility of bistable elements used heretofore, but which will be capable of producing an alternating voltage response when stimulated by a direct voltage impulse or by a magnetic field change. Consequently, new modes of transmission, modulation, detection and other forms of processing of the output responses of memory devices are permitted or facilitated by this invention which were not possible or were difficult with previous types of bistable elements. Moreover, the invention permits construction of computer system matrices in relatively simple manner with minimum connections to the bistable elements therein.

A further object hereof is to provide a bistable memory device of a fundamentally simple form having readily controlled and predictable characteristics and controllable in design or application by any of different parameters, including physical dimensions, applied electric field, or applied magnetic field.

A further object hereof is to devise bistable switching or memory devices which produce an oscillatory output in response to a direct voltage stimulus and which additionally can be operated at different frequencies in the "on" state depending upon the variable value of applied voltage. Accordingly, the invention makes possible not only memory or switching functions but the use of a single element to provide different output responses, when in the "on" state, which are related to different values of voltage performing the switching.

A further important object is to provide solid-state memory devices which can be combined in a matrix with common output buses, yet can signal their states (i.e. on or off) individually to external circuits and without the requirement for complicated circuitry as heretofore.

The existence of helical instability in solid-state electron-hole plasma has been known for some time. In accordance with the present invention, the existence of a hysteresis in the conditions of such devices necessary for producing the switching between the quiescent and helical instability states of the plasma is applied in a new class of bistable or memory type elements satisfying the above and related objects. The state of the plasma may be switched by maintaining an applied electric field at constant value and varying the magnetic coercive force applied to the plasma, such as by varying the flow of current in a coil of wire surrounding the plasma element. Usually, more conveniently the coercive force may be held constant and the state of the plasma switched by changing the voltage of the power supply applying the electric field. In either instance, detection of the state of the element is accomplished by responding to the presence or the absence of an oscillatory component of current or voltage in the element corresponding to the frequency of the plasma helical instability within the element. By utilizing the power supply modulation technique for performing the read-in and read-out functions, the necessity for separate read-in and read-out conductors leading from the elements in the matrix of a computer is obviated. By sensing the superimposed oscillations of the plasma in the power supply conductors common to the element, the necessity for separate output response conductors connected to the individual elements may also be eliminated. Use of suitable frequency selective filter circuits or other spectrum analyzer means connected with the power supply permit detecting the presence or absence of the oscillatory state in the different individual plasma elements and may provide suitable output channels for performing desired computer functions or switching functions for which a particular system may be intended. Thus, one important advantage of the invention in a computer or multi-element switching system is the permissive utilization of a single modulated power supply common to a plurality of plasma elements, as the control medium for the read-in and read-out functions and as a common communication medium in sensing plasma state of the memory elements.

In addition to the method of switching the elements into the "on" state by application of direct voltage sufficiently above quiescent level to exceed the threshold point, there is another method that may be used. It is to superimpose upon the elements, or any of them, an alternating voltage corresponding to threshold frequency of a selected element or elements for a short time period. Even through such alternating voltage is only a small fraction of the direct voltage required at threshold to initiate oscillations it is capable of inducing the state of helical instability. Thus, an additional means to perform the read-in function is provided which involves application of selected switching-frequency signals superimposed on the quiescent bias level common to the elements, thereby to selectively activate certain plasma elements into the oscillatory condition which bear design correspondence to the applied frequencies.

While the electron and hole mobilities are usually greater at cryogenic liquid temperatures for the different solid materials which will sustain a plasma in the alternative states, it is readily possible to devise elements and systems wherein room temperature operation is permissible, and also systems capable of operating throughout a very wide range of temperature. It is also readily possible by design to predetermine the threshold conditions for helical instability, hence oscillations, in the element, depending upon the electric field strength, the magnetic field strength, and the choice of material. Of particular importance, oscillation frequency of a plasma at threshold will differ with design differences in threshold conditions. Thus, an element having a design threshold corresponding to a particular electric field-magnetic field strength product will oscillate at one frequency at threshold, whereas a similar element having its threshold at a different value of electric field-magnetic field strength product will exhibit a different threshold frequency. As a result the plasma states in the two different elements may be detected separately, and distinctively, by sensing their respective operating frequencies at threshold. Material type and physical radius of the individual elements are also factors in determining plasma oscillation frequency at a given electric field strength. Also, employing elements of different lengths subjected to the same applied voltage in a common matrix represents another way of creating different threshold points and threshold frequencies in the different elements. These factors permit conveniently extending the number of elements which may be incorporated in a complex matrix.

There is an additional factor which permits increasing the bits of information which may be stored in a single element. It is the fact that oscillation frequency of an unstable plasma can be made to vary with voltage or magnetic field above threshold conditions, and, with extreme variations, even caused to change mode of oscillation to a different range of frequency altogether or to a very noisy mode unique in itself. Thus, supplemental to the storage or memory function, utilizing the bistable oscillatory characteristic of such elements, use may be made of the distinctive frequency variation and changeable mode characteristics of a solid-state plasma element.

These and other features, objects and advantages of the invention will become more fully evident from the following detailed description thereof by reference to the accompanying drawings.

Figures 6A, 6B, 7, 8, 9, 10:
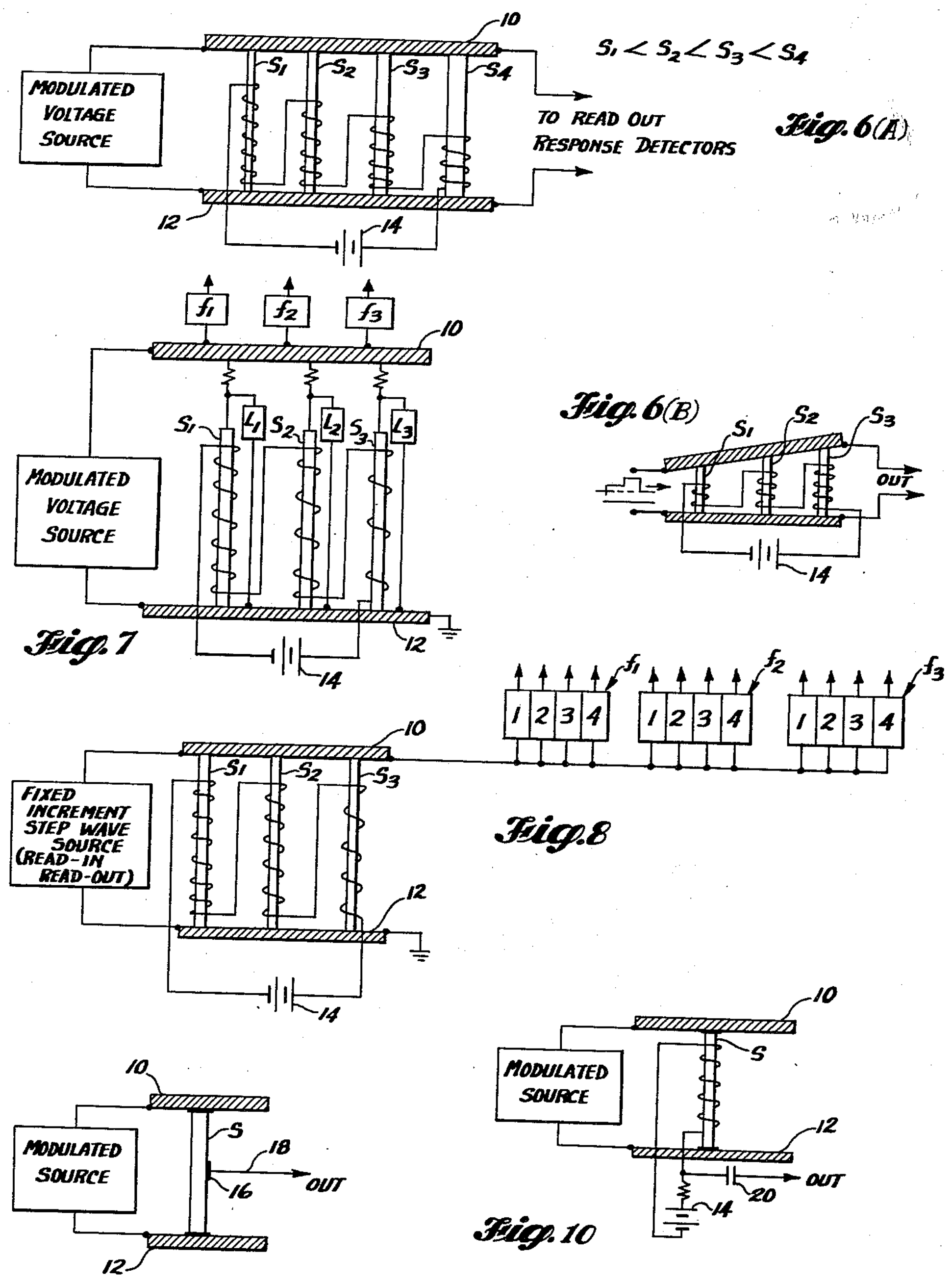
FIGURE 6(A) is a simplified schematic illustrating a matrix of plasma elements of different radii.
FIGURE 6(B) is a similar schematic in which the elements are of different lengths.
FIGURE 7 is a simplified schematic of a storage system with voltage limiters associated with the respective plasma elements to limit the voltage excursion of each at a discrete upper value (usually the threshold), insuring production of a single output frequency therefrom when in the "on" state.

FIGURE 8 is a simplified schematic of a storage system wherein the modulated voltage source has an output excursion extending over a range of different discrete values which are capable of switching each plasma element between its off (quiescent) and on (oscillatory) states and of establishing different selected frequencies or modes of oscillation in any element which is oscillatory, depending upon the selected value of voltage then being applied.

FIGURE 9 and 10 illustrate alternative ways of sensing the state of a plasma element for purposes of external circuit communication.

Figure 1A:
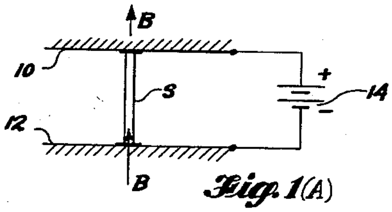
FIGURE 1(A) is a schematic diagram of a solid-state element and associated means to produce helical instability in injected plasma within the element.
Figure 1B:
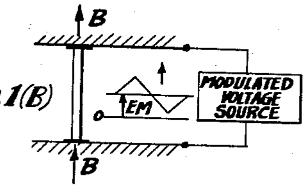
FIGURE 1(B) is a schematic diagram of the solid-state element connected to a modulated voltage source capable of driving the plasma through its hysteresis range to switch the same between states.

Referring to FIGURE 1(A) the solid-state element S typically comprises an elongated bar of element semiconductor, compound semiconductor or semimetal material connected at opposite ends by soldering or otherwise to bus bar conductors 10 and 12 across which the voltage of a source 14 is impressed. The applied voltage is sufficient to create an electron-hole plasma in the body of material, which in the presence of a magnetic field B under certain conditions (i.e. when the electric-magnetic fields product is sufficiently high) becomes unstable. This instability is characterized by a moving helical pattern in the plasma, giving rise to traveling electrical waves of a discrete frequency moving along the element. These waves may be detected electrically in any suitable manner such as by sensing the attendant current or voltage oscillations occurring in the voltage source or its connections to the element (assuming finite source impedance at the wave frequency). In order to attain the helical instability effect, magnetic and electric flux lines must approach parallel or anti-parallel relationship. The frequency at which the oscillations occur at threshold depends upon the cross-section of the element, the applied voltage and constants of the material (e.g.) initial electron and/or hole density, etc.).

The described electron-hole plasma effects may be produced in a wide variety of well-known solids. Germanium and silicon as representative of element semiconductors, indium-antimonide, aluminum-phosphide, boron-arsenide, gallium-phosphide, gallium-antimonide as representative of III–V compound semiconductors, cadmium-sulfide and zinc-selenide as representative of II–VI compound semiconductors and generally all semiconductor or semiconductor compounds and some of the semimetals may be used. In terms of periodic chart elemental position, many compounds of elements from groups III and V, from groups II and VI, or from groups I and VII may be employed. The invention is not specifically concerned with the specific choice of materials nor in the range of choices.

Figure 2A:
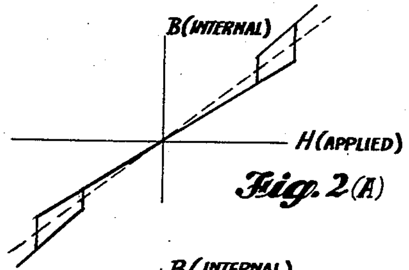
FIGURE 2(A) is a diagram depicting the B–H hysteresis characteristic of the bistable plasma.
Figure 2B:
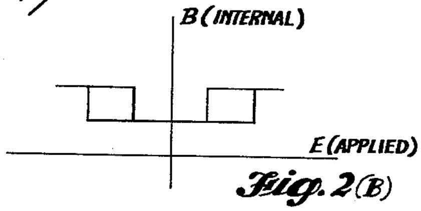
FIGURE 2(B) is a diagram depicting the B–E hysteresis characteristic, these diagrams illustrating that the hysteresis effect obtains when the magnetic and electric fields are either parallel or antiparallel.

Of particular significance herein is the discovery and application of a unique hysteresis effect which is found to occur in the conditions necessary for producing the helical instability in solid-state electron-hole plasma. The B–H curve for such an element is shown in FIGURE 2(A). FIGURE 2(B) represents a typical B–E curve for such an element. The hysteresis loops seen in these figures result from the fact that the injected plasma in the solid can exist in either the normal quiescent state or in a rapidly rotating, helical state.

Figure 3A:
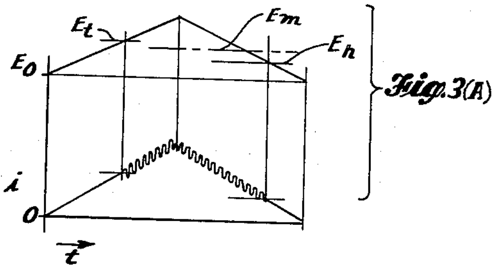
FIGURE 3(A) depicts the effect of applying a triangular waveform of voltage to the plasma in terms of the hysteresis effect of conditions producing oscillations therein.

A magnetizing coil placed around the solid element can be used to switch it between states by a change of current in the coil, with a given electric field potential applied to the element. Alternatively, as shown in FIGURE 2 the switching may be performed by modulation of the power supply voltage or current. The hysteresis effect is most readily demonstrated visibly by taking an oscillogram of voltage (most easily detected) across a portion of its length, or of current in the solid element, with a triangular voltage waveform applied as in graph E, FIGURE 3(A). As the voltage rises a value $E_t$ is reached (depending upon the magnetic coercive force being applied to the element) corresponding to the instability threshold of the element. Oscillations are initiated which are of a frequency dependent upon physical constants of the solid element and upon the applied voltage at threshold. These oscillations persist through a further rise and descent of the applied voltage and, due to the hysteresis effect, do not cease until such voltage has dropped to a value $E_h$ which is markedly below the original threshold voltage $E_t$. Thus by biasing the solid element at a normal quiescent voltage $E_m$ which is intermediate the values $E_t$ and $E_h$ read-in binary digited data may be effected by positive or negative excursions of source voltage. Thereafter digit values are sensed during read-out by detecting the presence or absence of oscillations in the element. The element is bistable, that is it remains in either assigned state, as long as applied voltage does not vary beyond either $E_t$ or $E_h$. The action is similar to that produced in magnetic core memory devices or the like, except in this instance the response is not directly in terms of a direct voltage pulse but comprises an oscillatory condition. The production of either a direct voltage level or high-frequency oscillation in the respective states of the bistable element offers a number of obvious advantages in terms of the processing and transmission of read-out response data due partly to the greater ease of handling alternating currents.

Figure 3B:
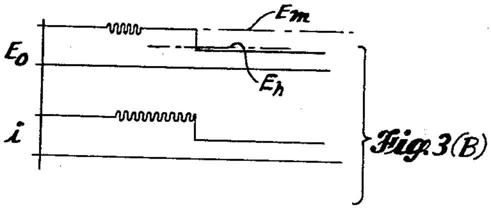
FIGURE 3(B) depicts the effect of applying oscillations of selected frequency (threshold frequency) to a plasma biased to a value of voltage intermediate the threshold limit values.

In FIGURE 3(B) the applied voltage is initially a quiescent bias such as the value $E_m$. Switching of the plasma to the oscillatory condition in this case is accomplished by superimposing an oscillatory voltage of selected frequency upon the bias voltage. Even though this oscillatory voltage has an amplitude considerably less than the difference between $E_m$ and $E_t$ it can induce threshold frequency oscillations in the plasma, and once they are created they will not terminate until the applied D.C. voltage is dropped to the value $E_h$ or lower, due to the hysteresis or memory effect of the unstable plasma.

Figures 4, 5:
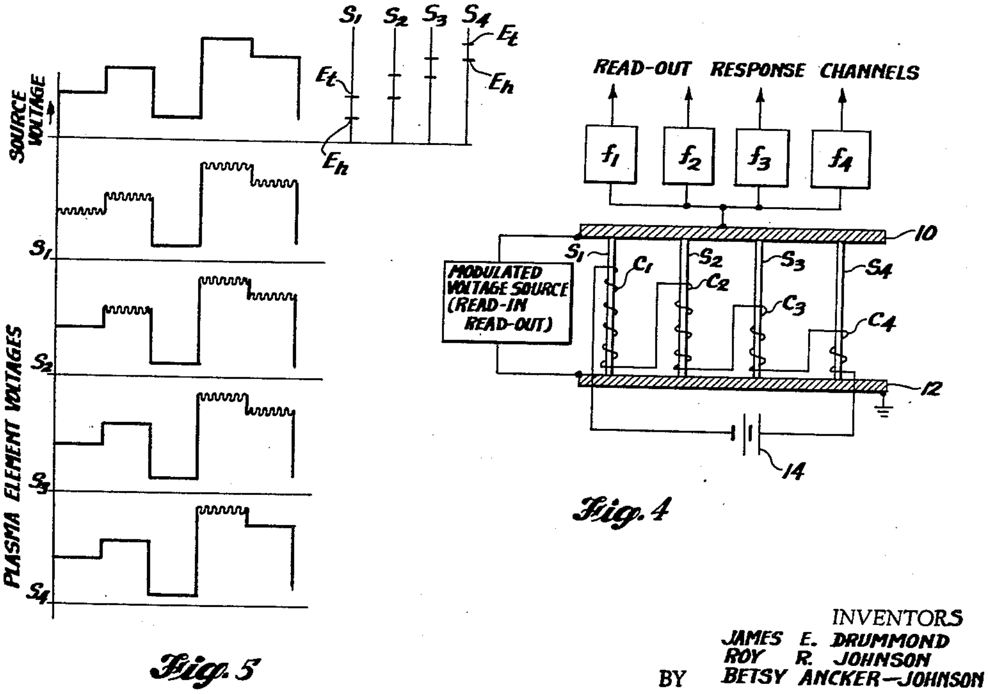
FIGURE 4 is a simplified schematic diagram of a data storage system with provision for read-in and read-out through modulation of the power supply voltage, and with means to detect the states of the different memory elements.
FIGURE 5 shows voltage-time diagrams applicable to the system of FIGURE 4 with a typical applied voltage waveform, such as might be employed with the device functioning as a tally or computing register.

In FIGURE 4 a plurality of solid-state memory elements $S_1$, $S_2$, $S_3$ and $S_4$ are connected between the voltage source buses 10 and 12 and are subjected individually to coercive forces by the respective coils $C_1$, $C_2$, $C_3$ and $C_4$ serially connected across source 14. These coils have different numbers of turns, so that with the elements otherwise identical, the threshold voltages of the elements at the respective points of helical instability differ correspondingly. Because their thresholds occur at respectively different voltages their individual frequencies of oscillation at threshold will differ. A series of frequency selective circuits such as filters $f_1$, $f_2$, $f_3$ and $f_4$ all connected to the bus 10 and individually tuned to respective threshold frequencies of the elements will then be capable of detecting the states of the elements on an individual basis. No separate wiring connections to the individual elements are required to perform this sensing or translating function inasmuch as each element identifies itself in signaling its state by the particular frequency at which it oscillates.

As shown in FIGURE 5 a succession of square waves may be employed to perform the read-in and read-out functions with respect to the system shown in FIGURE 4. To the right-hand side of this source voltage graph is depicted the different hysteresis limit voltages assumed for the respective elements $S_1$, $S_2$, $S_3$ and $S_4$. From a projection of these limit voltage values onto the voltage scale of the source waveform the plasma element current waveforms for the respective elements may be predicted as shown in the underlying waveform graphs. Superimposed oscillations occur on the steps or plateaus of the latter in accordance with stimulation of the bistate properties of each element identified.

FIGURE 6(A) illustrates the practical effect of employing a matrix of solid elements of different cross-section such that the helix radii differ and thereby their instability frequencies at threshold. This is a practical technique to achieve specified design frequencies for the individual elements. FIGURE 6(B) illustrates still another technique to achieve a similar result, also to achieve separation of thresholds, namely by employing elements of different physical length across which the same voltage is applied. In other words, it is not necessary to accept the particular frequencies for the elements which would result from assignment of different threshold voltages by the magnetic coercive forces applied to the respective elements. Another way to achieve design differences in characteristic threshold frequencies of the elements is by use of different materials as elements.

It was stated in conjunction with FIGURE 4 that the individual solid elements identified themselves as to plasma state individually by virtue of their distinctive frequencies. However, it is found that these elements can be made to operate at a frequency which varies with applied voltage in the super-critical region (i.e. beyond threshold). Hence, with a large number of elements frequency separation may be desired such that oscillations of the different plasma elements may be separately identified without ambiguity. In FIGURE 7 this is accomplished by incorporating voltage limiters $L_1$, $L_2$ or $L_3$ and resistors $R_1$, $R_2$ and $R_3$ in connection with each of elements $S_1$, $S_2$ and $S_3$, whereby even though source voltage rises higher into the supercritical region beyond threshold voltage for any given element, the element's own voltage is held substantially at threshold value so that as long as it remains in the "on" state its frequency will hold constant. However, in FIGURE 8 advantage is taken of the dependence of oscillation frequency of the elements in voltage in their "on" state in order to permit useful storage of more information by a single element. This is accomplished by controlling or regulating the plateau voltages of the wave source at selected values or increments so as to produce certain desired frequencies in any individual element in its supercritical regime. Thus in the case of element $S_1$, the associated filter network $f_1$ is provided with a number (four in the example) of separate frequency selector channels each individually responsive to one of the frequencies at which element $S_1$ is assigned to oscillate at still another frequency during programmed read-in or read-out operation of the power supply. Such latter frequency (which may exist at a time when one of the other elements is operating at one of its assigned frequencies) is not one to which any of the filter network channels in the system is selectively tuned, either for element $S_1$ or for any of the other elements.

In FIGURE 9 the element $S_1$ is provided with a soldered joint 16 intermediate its ends to which an output conductor 18 is connected for transmitting oscillations in the element to an external circuit. In FIGURE 10 oscillations occurring in element $S_1$ are picked up by induction in the magnetizing coil $C_1$ and transmitted to an external circuit through D.C. blocking condenser 20.

With this new class of bistable memory devices instability state frequencies may be achieved ranging from as low as a several thousand cycles per second to tens of megacycles per second and higher. The oscillations may be made substantially pure sine waves.

Utitlizing the hysteresis effect involved in this invention in storage or memory devices with provisions for information retrieval or switching is disclosed in certain illustrated forms herein; however, it will be seen that a number of modifications and variations in the application of the novel principles and features are possible within the framework of the novel subject matter presented.

We claim as our invention:

1. A bistable memory device comprising a solid-state element, first means applying an electric field to such element to inject an electron-hole plasma therein, second means applying a magnetic field to such element with flux lines oriented generally parallel to the lines of electric field, read-in means operable upon at least one of said first and second means to increase the magnetic-electric field product to a value corresponding to the plasma's helical instability threshold for initiating oscillations in the element and to terminate such oscillations by decreasing such product to a value sufficiently below the first value to overcome hysteresis in the plasma, and sensing means operatively associated with the element and selectively responsive to the presence and absence of such oscillations.

2. The memory device defined in claim 1, wherein the read-in means modulates the applied electric field through a range energizing the plasma between its quiescent and helical instability states.

3. The memory device defined in claim 2, wherein the sensing means is responsively connected to the first means to detect oscillation superimposed on the applied voltage.

4. Data storage apparatus comprising a plurality of solid state elements, a voltage source including output conductors of opposite polarity across which said elements are connected in electrical parallel to inject an electron-hole plasma in each of said elements, means for applying a magnetic field to each of such elements with flux lines oriented generally parallel to the lines of electric field therein, said elements having respectively different helical instability thresholds and threshold frequencies, read-in means operable to modulate the source voltage by controllable increments through a range extending above the helical instability thresholds of all the plasmas for initiating oscillations in the elements and extending sufficiently below such thresholds to overcome hysteresis in the plasmas and terminate such oscillations, and sensing means operatively associated with the elements and selectively responsive to the presence and absence of such oscillations.

5. The memory device defined in claim 4, wherein the sensing means includes frequency-selective means responsively connected to the voltage source to detect oscillations at different plasma instability ferquencies superimposed on the applied voltage.

6. A computer matrix comprising voltage source conductors of opposite polarity, a plurality of solid-state elements connected in electrical parallel across said conductors to inject an electron-hole plasma in each of said elements under applied voltage, and means to produce a magnetic field in said elements with flux lines oriented generally parallel to the electric field lines therein, the electric field provided between said conductors and the magnetic field of said means operating to bias said elements to a condition intermediate the threshold and hysteresis values thereof for the onset and termination of helical instability plasmas in said element, said elements having respectively different helical instability thresholds and threshold frequencies.

7. A method of storing and recalling digital information in a solid-state element comprising applying magnetic and electric fields to the element, varying the product value of said fields through a range from a first value below the threshold value thereof for the onset of a helical instability plasma therein to a second value greater than said threshold value and then back to a second value higher than the hysteresis value thereof for said element to thereby switch the injected electron-hole plasma in the element between the quiescent and helical instability states, and detecting the change of state of the element responsively to such switching.

8. A method of storing and recalling digital information in a plurality of solid-state elements having respectively different helical instability thresholds and threshold frequencies, comprising applying magnetic and electric fields to the elements with the product value of said fields adjusted to a level intermediate the respective threshold and hysteresis values of said elements, varying the product values of said fields through a range switching the injected electron-hole plasmas in the elements selectively between quiescent and helical instability states, and detesting the changes of state of the respective elements responsively to such switching.

9. The method defined in claim 8, wherein the voltage applied to the elements is equal and their instability thresholds are made to differ by differences in the magnetic fields applied thereto.

10. A computer matrix comprising voltage source conductors of opposite polarity, a plurality of solid-state elements connected in electrical parallel across said conductors to inject an electron-hole plasma in each of said elements under applied voltage, and means to produce respectively different magnetic fields in said elements with flux lines oriented generally parallel to the electric field lines therein, the product value of the electric and magnetic fields in each of said elements corresponding to a value intermediate the respective threshold and hysteresis values thereof.

11. In a computer system, a plurality of solid-state electron-hole plasma elements subject to the helical instability effect, means applying electric and magnetic fields to said elements with the product of said fields having a value intermediate the threshold and hysteresis values thereof for each respective element and at least one of which fields is variable through the hysteresis range of the elements to switch such elements between quiescent and oscillatory states of their plasmas, said elements having respectively different threshold conditions in the transition from their quiescent to their instable plasma state.

12. In a data storage system, a plurality of solid-state electron-hole plasma elements subject to helical instability, means to apply magnetic field to the respective elements, a common power supply operatively connected to the elements for applying electric field to the elements with orientation generally parallel to the magnetic field therein, means to store and retrieve data in the respective elements including means to modulate the power supply voltage through the hysteresis limits of the elements to switch the plasmas in said elements selectively between their quiescent and instability states, and means to sense selectively oscillations in the respective elements in their instability states.

13. In a switching system having input means for applying read-in and read-out pulses and output means for delivering output signals in response to certain read-out pulses, a memory switching element comprising a body of solid material and electric and magnetic field producing means operatively associated therewith creating electron-hole plasma conditions in such element adapted to be switched through a hysteresis range between a quiescent state and a helical instability state of the plasma by application of said pulses to increase and decrease one of the fields applied to said element.

14. In a switching system having input means for applying read-in and read-out pulses and output means for delivering output signals in response to certain read-out pulses, a plurality of separate memory switching elements individually comprising a body of solid material and electric and magnetic field producing means connected to said input means and producing electron-hole plasma conditions in such element adapted to be switched through a hysteresis range between a quiescent state and a helical instability state of the plasma by application of said pulses to increase and decrease one of the fields applied to said element.

15. A bistable memory device comprising a solid-state element, first means applying an electric field to such element to inject an electron-hole plasma therein, second means applying a magnetic field to such element with flux lines oriented generally parallel to the lines of electric field, the product of said electric and magnetic fields corresponding to a value intermediate the threshold and hysteresis values thereof for the onset and termination of a helical instability plasma in said element, read-in means operable upon at least one of said first and second means to vary the magnetic-electric field product value to induce helical instability oscillations in the plasma and to terminate such oscillations by decreasing such product value sufficiently to overcome hysteresis in the plasma, and sensing means operatively associated with the element and selectively responsive to the presence and absence of such oscillations.

16. The memory device defined in claim 15, wherein the read-in means includes a source of quiescent bias voltage, means to superimpose upon said bias voltage oscillations of a frequency inducing helical instability oscillations in the plasma, and means to reduce the bias voltage sufficiently to terminate such induced oscillations.

17. A method of storing and recalling digital information in a solid-state element comprising applying biasing magnetic and electric fields to the element with the product of said biasing fields adjusted to a value between the threshold and hysteresis values thereof for the initiation and termination of a helical instability plasma in said element, varying the product value of said fields above said threshold value to produce oscillations in the injected electron-hole plasma in the element by changing the plasma from the quiescent state to the helical instability state, and detecting the said oscillations.

18. The method defined in claim 17, further comprising the step of reducing the product value sufficiently to overcome hysteresis in the conditions permitting oscillations in the plasma and thereby terminate such oscillations.

19. A method of storing and recalling information in a solid-state element comprising applying biasing magnetic and electric fields to the element having a product value intermediate the threshold product value for the onset of a helical instability plasma in the element and the hysteresis product value for termination of the helical instability plasma, applying a read-in signal to said element by applying an oscillatory field thereto of a frequency equal to the oscillation frequency of the helical instability plasma, and detecting the presence or absence of helical instability plasma oscillations.

References Cited by the Examiner

UNITED STATES PATENTS 3,042,852 7/62 Steele -------------- 340—173.1

OTHER REFERENCES

Pages 1519–1523, 9/60—Larrabee et al., The Oscillistor—New Type of Semiconductor Oscillator; Journal of Applied Physics.

Pages 79–80, 12/61—Marken et al., Compound Semiconductor Oscillator; IBM Technical Disclosure Bulletin, vol. 4, No. 7.

IRVING L. SRAGOW, *Primary Examiner.*